Aug. 8, 1967 S. S. BROWNLEE 3,334,950

RECORD FILING DEVICE

Filed Dec. 3, 1964 3 Sheets-Sheet 1

INVENTOR
SHERWOOD S. BROWNLEE
by: Gary, Parker, Juettner & Cullinan
ATTYS.

INVENTOR
SHERWOOD S. BROWNLEE
By: Gary, Parker, Juettner & Cullinan
ATTYS.

Aug. 8, 1967 S. S. BROWNLEE 3,334,950

RECORD FILING DEVICE

Filed Dec. 3, 1964 3 Sheets-Sheet 3

INVENTOR
SHERWOOD S. BROWNLEE by: Gary, Parker, Juettner & Cullinan
ATTYS.

United States Patent Office 3,334,950
Patented Aug. 8, 1967

3,334,950
RECORD FILING DEVICE

Sherwood S. Brownlee, Waynesboro, Va., assignor to Acme Visible Records, Inc., Crozet, Va., a corporation of Delaware

Filed Dec. 3, 1964, Ser. No. 415,586
6 Claims. (Cl. 312—10)

ABSTRACT OF THE DISCLOSURE

A device for filing records having a plurality of flexible dividers one end of each being slidably anchored. Said anchoring is accomplished by a notch in a divider slidably engaged with a flange on the file casing. Tubular resilient material secured to the other end of the dividers provides the frictional forces for retaining stored records.

*Summary of the invention*

A filing device comprising a casing including base and top members, a plurality of flexible dividers disposed between said top and base members, means formed on inner end portions of said dividers in separable slidable engagement with reciprocal anchor means carried by said casing, and flexible resilient means carried by the opposed forward ends of said dividers retaining them thereat in yieldably spaced relationship to each other.

This invention relates to a record filing device and particularly to a device for filing a plurality of record books in vertically disposed horizontally spaced relationship.

It is a particular object of the present invention to provide a record filing device as aforesaid comprising a plurality of dividers which may be readily removed or replaced by a simple flexing operation when it is desired to increase or decrease the number of dividers.

It is a further object of the present invention to provide a record filing device of the class hereinabove described and which is particularly adapted to receive chart holders having rigid covers such as are used in hospitals, and which can be easily inserted in between partitions and adapted to be frictionally retained between the partitions.

It is a further object of the present invention to provide a record filing device or chart holder comprising a plurality of vertically disposed dividers formed with buffer rolls at their forward or outer edges of a resilient character so that when the device has its full complement of dividers these rolls press lightly together and stabilize the chart holders against "slap" and also reduce noise in insertion and withdrawal.

One specific embodiment of the present invention relates to a rotary record filing device wherein the partitions are disposed in a radial direction, and in another not fully equivalent embodiment the device of the present invention comprises a rectangular housing wherein the component dividers are disposed substantially normal to the back of the housing.

Further objects and advantages of the present invention pertain to economies thereof, details of construction and arrangement of parts as will be apparent from the following specification and accompanying drawings, wherein.

Figure 1:
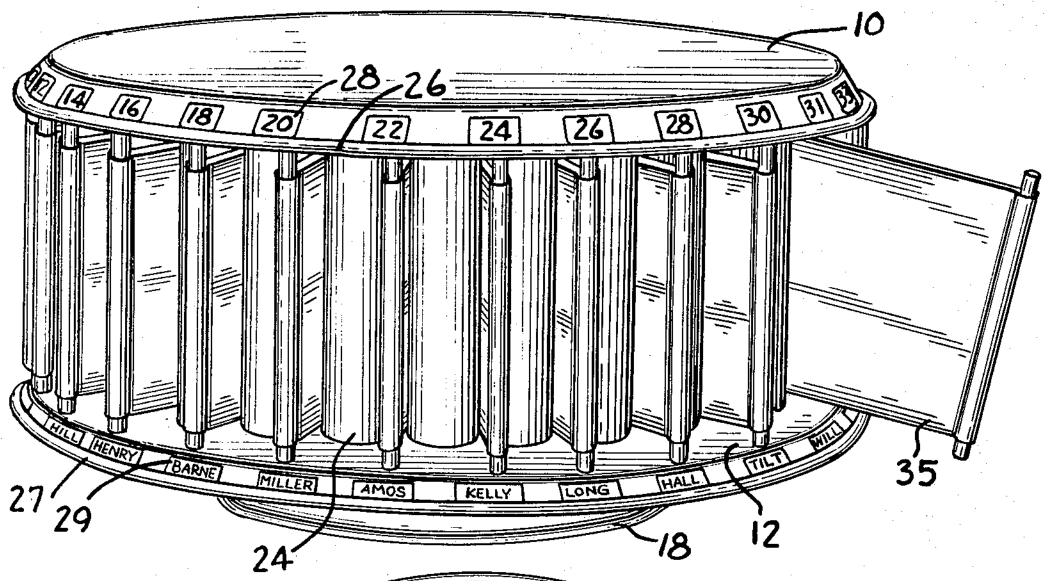
FIG. 1 is a perspective view of a rotary record filing device of the present invention.
Figure 2:
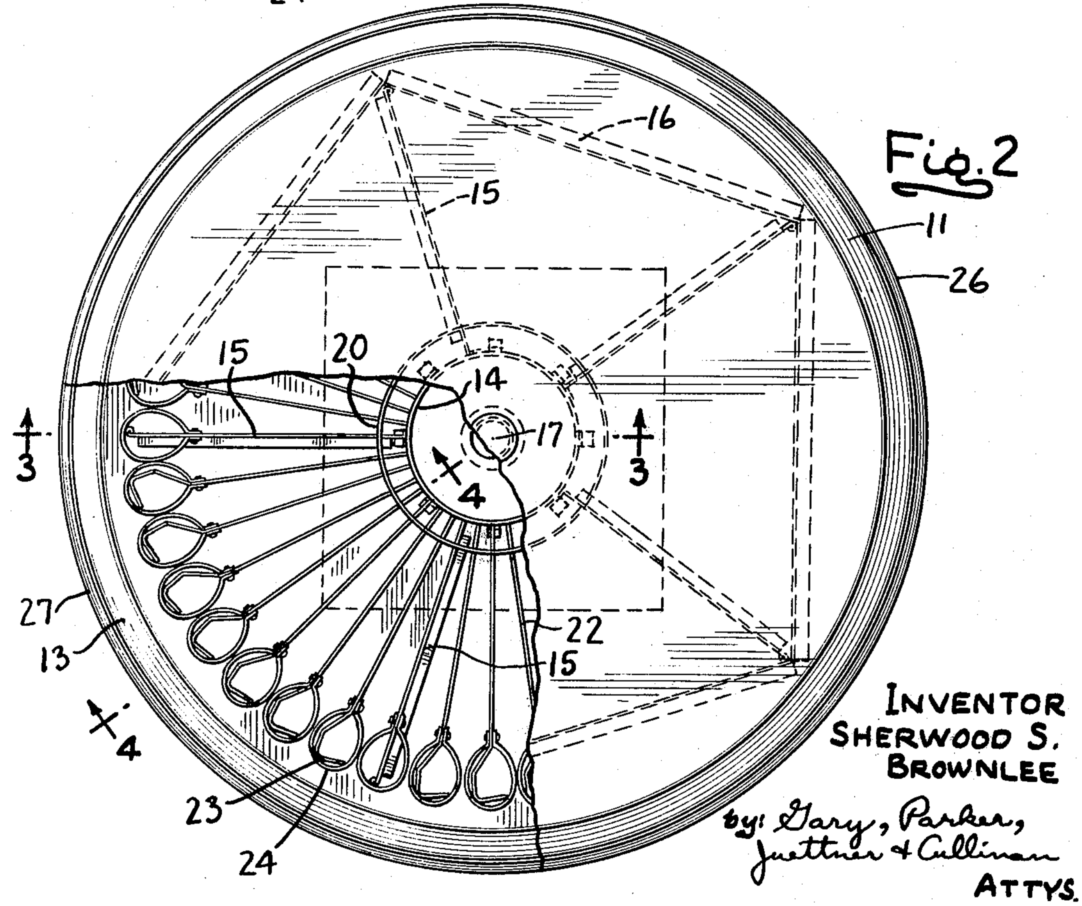
FIG. 2 is a top plan view thereof with parts broken away.
Figures 3, 4:
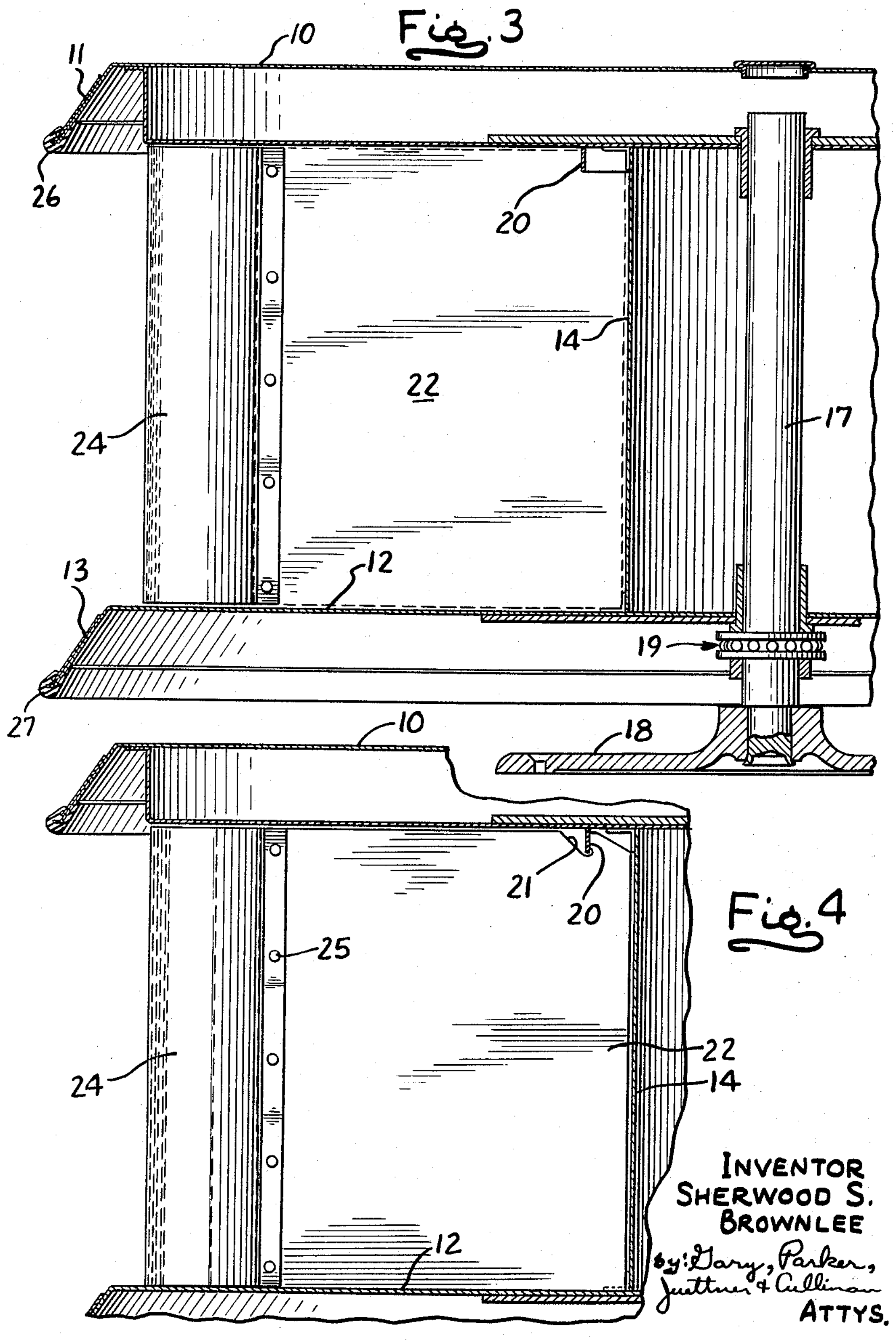
FIG. 3 is a fragmentary vertical section on the line 3—3 of FIG. 2.
FIG. 4 is a fragmentary vertical section on the line 4—4 of FIG. 2.

Referring to the drawings, and particularly FIGS. 1 to 4, the device of the present invention comprises an upper disc section 10 having an inclined flange 11, and a lower or bottom section 12 having a similar flange edge 13. These discs 10 and 12, which are suitably made of metal, are maintained in rigid spaced relationship by the cylinder 14 and the fixed radially spaced vertical stabilizers 15. The drawing shows five stabilizers although this number may be varied. The cylinder 14 and the fixed vertical stabilizers 15 are spaced below the upper disc 10 by the channel sections 16. The assembly is adapted to rotate about the vertical shaft 17, is supported on a base 18 and adapted to rotate on the bearing assembly 19.

Mounted beneath the upper disc section 10 and concentric with the cylinder 14 is a retainer ring or flange 20 adapted for engagement with the yieldable flexible notched portion 21 opening to the upper edge near the inner end of the partition member 22. This partition member 22 is suitably made of fiberboard such as that known as vulcanized fiber, and of approximately $\frac{1}{32}''$ in thickness. The outer edge of the divider 22 is angularly bent as at 23 and thereat embraced by the tube or buffer roll of resilient plastic sheet material 24 which can suitably be of cellulose acetate, Mylar (polyethylene terephthalate), vinyl sheeting and the like, in a thickness of for example about 14 mils. This buffer roll 24 is suitably stapled to the divider 22 as at 25 and when a full complement of dividers 22 is disposed in the unit the rolls 24 press lightly together.

Record or chart holders 35 can then be inserted between an adjacent pair of dividers and between their buffer roll ends 24 so as to lightly compress these resilient buffer rolls and to be retained therebetween in a frictional manner and in a secure position. These partitions 22 can thus be seen to be adaptable to accommodate books, folders, panels and the like of various thickness. The partitions can be readily and easily removed or added to vary the capacity of the filing unit. While these dividers 22 are yieldably engaged by means of the notches 21 to the fixed angle members 20, they are yet slidable relative to the angle members, so that the distances between the dividers 22 can be varied to accommodate material disposed or not disposed between them.

The inclined flanges 11 and 13 are shown to be provided at their lower edges with moldings 26 and 27 respectively providing mounting means for index tabs as at 28 and 29, respectively, such as for example bed numbers at the top and patients' name cards at the bottom.

Figure 5:
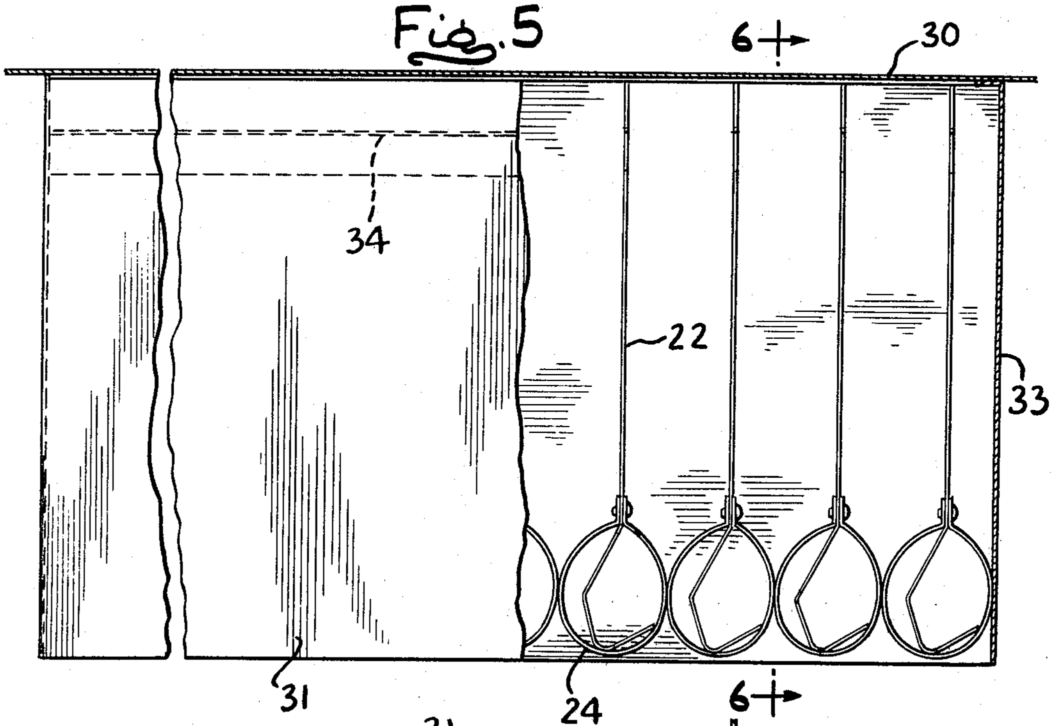
FIG. 5 is a fragmentary plan view with parts broken away of a modified or rectangular form of record filing device of the present invention.
Figure 6:
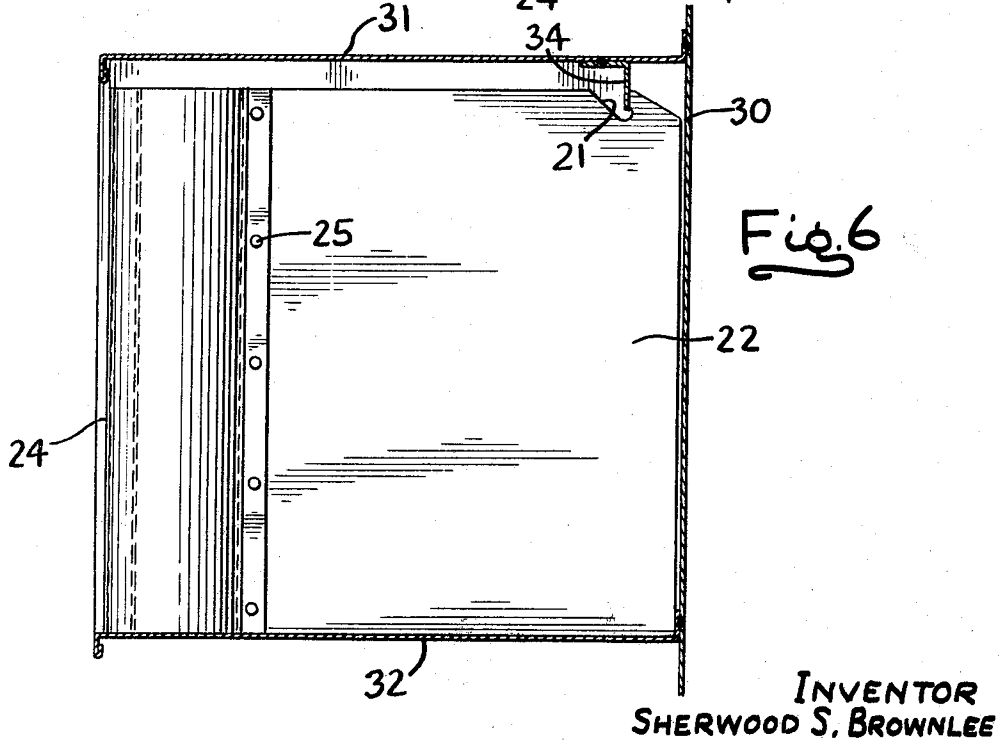
FIG. 6 is a vertical section on the line 6—6 of FIG. 5.

The assembly of FIGS. 5 and 6 employs similar dividers 22 having their outer edges embraced by resilient buffer rolls 24 as in FIGS. 1 to 4. In this case, the holder device is rectangular and comprises a backing 30, a top 31, and a bottom 32. The top and bottom are suitably held spaced from each other by means of a plurality of rigid metal spacers 33 which extend normal to and vertically between the top and bottom 31 and 32. Adjacent to the backing 30 and secured to the top member 31 is the downwardly extending flange 34 adapted to engage with the notch portion 21 of a divider 22 so that they can be yieldably engaged or disengaged as described with respect to the forms of FIGS. 1 to 4 and employed in a similar manner.

It will thus be seen from the foregoing that my novel arrangement and construction results in a file unit of pleasing appearance which will provide a selectively and variable capacity for filing a variety of devices and thicknesses of records, and will hold these records in a firm position and thus prevent clatter or displacement such as for example might occur when the rotary unit form of the invention is revolved. The overall construction is seen to be inexpensive to manufacture and easy to assemble.

Although I have shown and described the preferred embodiments of my invention it will be understood by those skilled in the art that changes may be made in the details thereof without departing from its scope as comprehended by the following claims.

I claim:

1. A filing device comprising a casing including base and top members, a plurality of flexible rectangular dividers disposed between said top and base members, anchoring notch means formed on inner end portions of said dividers opening to a horizontally disposed edge portion in separable slidable engagement with reciprocal vertically disposed anchor flange means carried by said casing, and flexible resilient vertically disposed tubular means carried by the opposed forward ends of said dividers retaining them thereat in yieldably spaced relationship to each other.

2. A filing device comprising a casing including base and top members, a plurality of flexible rectangular dividers vertically disposed between said top and base members, anchoring notch means formed on inner end portions of said dividers opening to a horizontally disposed edge portion in separable slidable engagement with reciprocal vertically disposed anchor flange means carried by said casing, and tubular flexible resilient means carried by the opposed forward ends of said dividers retaining them thereat in yieldably spaced relationship to each other.

3. A device for filing records in vertically disposed horizontally spaced relationship comprising a casing including base and top members, a plurality of spaced fixedly secured dividers disposed between said top and base members, a plurality of flexible rectangular dividers disposed between the former, means formed on inner end portions of said flexible dividers opening to a horizontally disposed edge portion in separable slidable engagement with reciprocal vertically disposed anchor flange means carried by said casing, and flexible resilient vertically disposed tubular means carried by the opposed forward ends of said dividers retaining them thereat in yieldably spaced relationship to each other.

4. A device for filing records in vertically disposed horizontally spaced relationship comprising a circular casing including base and top members, a plurality of flexible rectangular radially extending dividers disposed between said top and base members, anchoring notch means formed on inner end portions of said dividers opening to a horizontally disposed edge portion in separable slidable engagement with reciprocal vertically disposed anchor flange means carried by said casing, and flexible resilient vertically disposed tubular means carried by the opposed forward ends of said dividers retaining them thereat in yieldably spaced relationship to each other.

5. A device for filing a plurality of records in vertically disposed horizontally spaced relationship comprising a rectangular casing including base and top members, a plurality of flexible rectangular substantially parallel dividers disposed between said top and base members, anchoring notch means formed in inner end portions of said dividers opening to a horizontally disposed edge portion in separable slidable engagement with reciprocal vertically disposed anchor flange means carried by said casing, and flexible resilient vertically disposed tubular means carried by the opposed forward ends of said dividers retaining them thereat in yieldably spaced relationship to each other.

6. A device for filing a plurality of records in vertically disposed horizontally spaced relationship comprising a casing including base and top members, a plurality of flexible rectangular dividers disposed between said top and base members, fixed vertically extending anchor bar means carried by said casing, notch means formed on inner end portions of said dividers opening to a horizontally disposed edge portion in separable slidable engagement with said anchor bar means, and flexible, resilient, bulbous tubular means carried by the opposed forward ends of said dividers retaining them thereat in yieldably spaced relationship to each other.

References Cited

UNITED STATES PATENTS

| | | | |
|---|---|---|---|
| 1,018,612 | 2/1912 | Wood | 312—10 |
| 1,076,993 | 10/1913 | Pooler | 312—12 |
| 1,310,814 | 7/1919 | Ward | 312—10 |
| 1,397,940 | 11/1921 | Vastola | 312—11 |
| 2,740,682 | 4/1956 | Keiper | 312—12 |
| 3,146,041 | 8/1964 | Lambert | 312—10 |
| 3,203,748 | 8/1965 | Toms | 312—305 |
| 3,221,890 | 12/1965 | Wassell | 312—305 |
| 3,258,126 | 6/1966 | Frey | 312—10 X |

DAVID J. WILLIAMOWSKY, *Primary Examiner.*

J. L. KOHNEN, *Assistant Examiner.*